(12) United States Patent
Desimone

(10) Patent No.: US 11,151,251 B2
(45) Date of Patent: Oct. 19, 2021

(54) SYSTEM AND METHOD FOR VALIDATING IN-MEMORY INTEGRITY OF EXECUTABLE FILES TO IDENTIFY MALICIOUS ACTIVITY

(71) Applicant: Endgame, Inc., Arlington, VA (US)

(72) Inventor: Joseph W. Desimone, Hanover, MD (US)

(73) Assignee: Endgame, Inc., Arlington, VA (US)

( * ) Notice: Subject to any disclaimer, the term of this patent is extended or adjusted under 35 U.S.C. 154(b) by 0 days.

(21) Appl. No.: 15/648,887

(22) Filed: Jul. 13, 2017

(65) Prior Publication Data

US 2019/0018962 A1 Jan. 17, 2019

(51) Int. Cl.
*G06F 21/56* (2013.01)
*G06F 21/55* (2013.01)
*H04L 29/06* (2006.01)
*G06F 9/54* (2006.01)

(52) U.S. Cl.
CPC ............ *G06F 21/566* (2013.01); *G06F 9/544* (2013.01); *G06F 21/552* (2013.01); *G06F 21/565* (2013.01); *H04L 63/145* (2013.01); *H04L 63/1416* (2013.01); *H04L 63/1441* (2013.01)

(58) Field of Classification Search
CPC ...... G06F 21/566; G06F 9/544; G06F 21/552; G06F 21/565; H04L 63/1416; H04L 63/1441
See application file for complete search history.

(56) References Cited

U.S. PATENT DOCUMENTS

| 5,481,684 A | 1/1996 | Richter et al. |
| 7,085,928 B1 | 8/2006 | Schmid et al. |
| 7,640,589 B1 | 12/2009 | Mashevsky et al. |
| 8,555,385 B1 | 10/2013 | Bhatkar et al. |
| 8,555,386 B1 | 10/2013 | Belov |
| 9,055,093 B2 | 6/2015 | Borders |
| 9,292,689 B1 * | 3/2016 | Chuo ................... H04L 63/145 |
| 9,356,944 B1 | 5/2016 | Aziz |
| 9,407,648 B1 | 8/2016 | Pavlyushchik et al. |
| 9,509,697 B1 | 11/2016 | Salehpour |

(Continued)

FOREIGN PATENT DOCUMENTS

| EP | 2784716 A1 | 10/2014 |
| EP | 3652639 A1 | 5/2020 |

(Continued)

OTHER PUBLICATIONS

"International Search Report" and "Written Opinion of the International Searching Authority," Patent Cooperation Treaty Application No. PCT/US2018/042005, dated Oct. 1, 2018, 7 pages.

(Continued)

*Primary Examiner* — Eleni A Shiferaw
*Assistant Examiner* — Bassam A Noaman
(74) *Attorney, Agent, or Firm* — Carr & Ferrell LLP

(57) ABSTRACT

A malicious code detection module identifies potentially malicious instructions in volatile memory of a computing device before the instructions are executed. The malicious code detection module identifies an executable file, including an .exe file, in memory, validates one or more components of the executable file against the same file stored in non-volatile storage, and issues an alert if the validation fails.

22 Claims, 5 Drawing Sheets

(56) References Cited

U.S. PATENT DOCUMENTS

| | | |
|---|---|---|
| 9,690,606 B1 | 6/2017 | Ha et al. |
| 10,045,218 B1 | 8/2018 | Stapleton |
| 10,397,255 B1 | 8/2019 | Bhalotra et al. |
| 2003/0200464 A1 | 10/2003 | Kidron |
| 2004/0199763 A1 | 10/2004 | Freund |
| 2005/0102601 A1* | 5/2005 | Wells .................... H04L 63/145 714/758 |
| 2005/0160313 A1 | 7/2005 | Wu |
| 2006/0026569 A1* | 2/2006 | Oerting .................. G06F 21/51 717/126 |
| 2006/0143707 A1 | 6/2006 | Song et al. |
| 2007/0180509 A1 | 8/2007 | Swartz et al. |
| 2008/0034429 A1 | 2/2008 | Schneider |
| 2008/0052468 A1 | 2/2008 | Speirs et al. |
| 2008/0127292 A1 | 5/2008 | Cooper et al. |
| 2008/0201778 A1 | 8/2008 | Guo |
| 2009/0049550 A1 | 2/2009 | Shevchenko |
| 2009/0077664 A1 | 3/2009 | Hsu et al. |
| 2009/0187396 A1 | 7/2009 | Kinno et al. |
| 2009/0222923 A1 | 9/2009 | Dixon |
| 2010/0100774 A1 | 4/2010 | Ding et al. |
| 2010/0293615 A1* | 11/2010 | Ye .......................... G06F 21/566 726/22 |
| 2011/0167434 A1 | 7/2011 | Gaist |
| 2011/0271343 A1 | 11/2011 | Kim et al. |
| 2012/0054299 A1* | 3/2012 | Buck ..................... G06F 21/565 709/217 |
| 2012/0159625 A1* | 6/2012 | Jeong .................... G06F 21/562 726/23 |
| 2012/0246204 A1 | 9/2012 | Nalla et al. |
| 2013/0283030 A1* | 10/2013 | Drew .................. G06F 11/1433 713/100 |
| 2013/0332932 A1 | 12/2013 | Teruya et al. |
| 2013/0347111 A1 | 12/2013 | Karta et al. |
| 2014/0032915 A1* | 1/2014 | Muzammil ........... H04L 9/3236 713/176 |
| 2014/0137184 A1 | 5/2014 | Russello et al. |
| 2014/0310714 A1 | 10/2014 | Chan et al. |
| 2014/0380477 A1* | 12/2014 | Li ...................... H04L 63/1466 726/23 |
| 2015/0020198 A1 | 1/2015 | Mirski et al. |
| 2015/0150130 A1 | 10/2015 | Fiala et al. |
| 2015/0264077 A1 | 10/2015 | Berger et al. |
| 2015/0278513 A1 | 10/2015 | Krasin et al. |
| 2015/0295945 A1 | 10/2015 | Canzanese |
| 2015/0339480 A1 | 11/2015 | Lutas et al. |
| 2016/0180089 A1 | 6/2016 | Dalcher |
| 2016/0232347 A1 | 8/2016 | Badishi |
| 2016/0275289 A1 | 9/2016 | Sethumadhavan et al. |
| 2016/0328569 A1 | 11/2016 | Momot |
| 2016/0357958 A1 | 12/2016 | Guidry |
| 2016/0364236 A1 | 12/2016 | Moudgill et al. |
| 2017/0004309 A1* | 1/2017 | Pavlyushchik ......... G06F 9/544 |
| 2018/0032728 A1 | 2/2018 | Spisak |
| 2018/0307840 A1 | 10/2018 | David et al. |
| 2019/0018958 A1 | 1/2019 | Desimone |

FOREIGN PATENT DOCUMENTS

| | | |
|---|---|---|
| EP | 3652667 A1 | 5/2020 |
| WO | WO2019014529 A1 | 1/2019 |
| WO | WO2019014546 A1 | 1/2019 |
| WO | WO2018026658 A1 | 2/2019 |

OTHER PUBLICATIONS

"International Search Report" and "Written Opinion of the International Searching Authority," Patent Cooperation Treaty Application No. PCT/US2018/041976, dated Sep. 28, 2018, 5 pages.

"International Search Report" and "Written Opinion of the International Searching Authority," Patent Cooperation Treaty Application No. PCT/US2017/044478, dated Oct. 10, 2017, 7 pages.

Canzanese et al., "System Call-Based Detection of Malicious Processes", 2015 IEEE International Converence on Software Quality, Reliability and Security, Aug. 3-5, 2015, IEEE, 6 pages.

"Extended European Search Report", European Patent Application No. 18831224.3, dated Mar. 29, 2021, 8 pages.

"Extended European Search Report", European Patent Application No. 18832453.7, dated Mar. 18, 2021, 9 pages.

* cited by examiner

SYSTEM AND METHOD FOR VALIDATING IN-MEMORY INTEGRITY OF EXECUTABLE FILES TO IDENTIFY MALICIOUS ACTIVITY

FIELD OF THE DISCLOSURE

The present disclosure relates to a system and method for detecting malicious instructions stored in memory of a computing device.

BACKGROUND

As computing devices become increasingly complex, viruses and malware also are becoming increasingly complex and difficult to detect and prevent. While the prior art includes many approaches for scanning non-volatile storage such as a hard disk drive for such threats, the prior art includes few satisfactory solutions for detecting malicious code loaded into memory or the processor itself. The prior art is particularly lacking in the ability to detect malicious instructions in memory before they are executed, particularly in situations where the malicious instructions are "new" and not part of a well-known virus or malware.

FIG. 1 depicts an exemplary prior art computing device 100 comprising processor 110, memory 120, and storage device 130. In this example, memory 120 is volatile and can comprise DRAM, SRAM, SDRAM, or other known memory devices. Storage device 130 is non-volatile and can comprise a hard disk drive, solid state drive, flash memory, or other known storage devices. Processor 110 comprises a single processor core or multiple processor cores and can include one or more cache memories. Processor 110 typically runs operating system 140.

Examples of operating system 140 include the operating systems known by the trademarks WINDOWS® by Microsoft and IOS® by Apple, CHROME OS® and ANDROID® by Google, Linux and others.

In FIG. 2, data is stored on storage device 130. There are numerous mechanisms to store data on storage device 130, and two known mechanisms are shown for illustration purposes. In one mechanism, data is stored as blocks 220 and can be accessed by logical block address (LBA) or similar addressing scheme. In another mechanism, data is stored as files 230 and can be accessed using a file system. In the prior art, scanning module 210 can be executed by processor 110 and can scan either blocks 220 or files 230 to look for malicious code. This often is referred to as virus scan software and is well-suited for identifying and nullifying known malicious programs that are stored in non-volatile devices such as in storage device 130.

While prior art techniques are well-suited for detecting known malicious programs in non-volatile devices, there is no satisfactory technique for detecting malicious instructions, which typically reside in executable files such as .exe files, in processor 110 or memory 120.

What is needed is a mechanism for detecting malicious instructions in processor 110 and memory 120.

BRIEF SUMMARY OF THE INVENTION

In the embodiments described herein, a malicious code detection module identifies potentially malicious instructions in volatile memory of a computing. The malicious code detection module identifies an executable file, such as an .exe file, in memory, validates one or more components of the executable file against the same file stored in non-volatile storage, and issues an alert if the validation fails. By generating the alert, potentially malicious code is brought to the attention of the user or administrator.

DETAILED DESCRIPTION OF PREFERRED EMBODIMENTS

Figure 1:
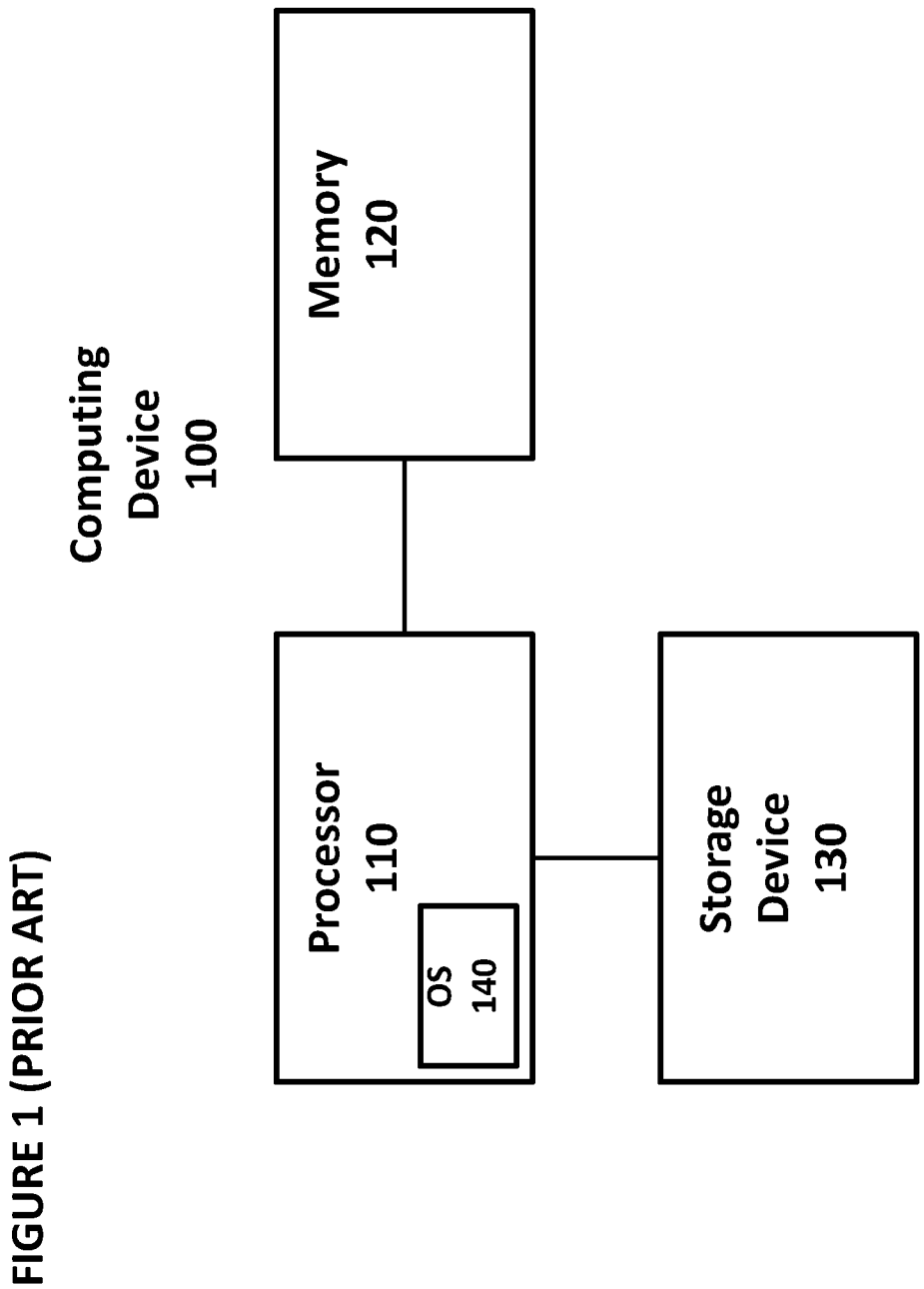
FIG. 1 depicts a prior art computing device.
Figure 2:
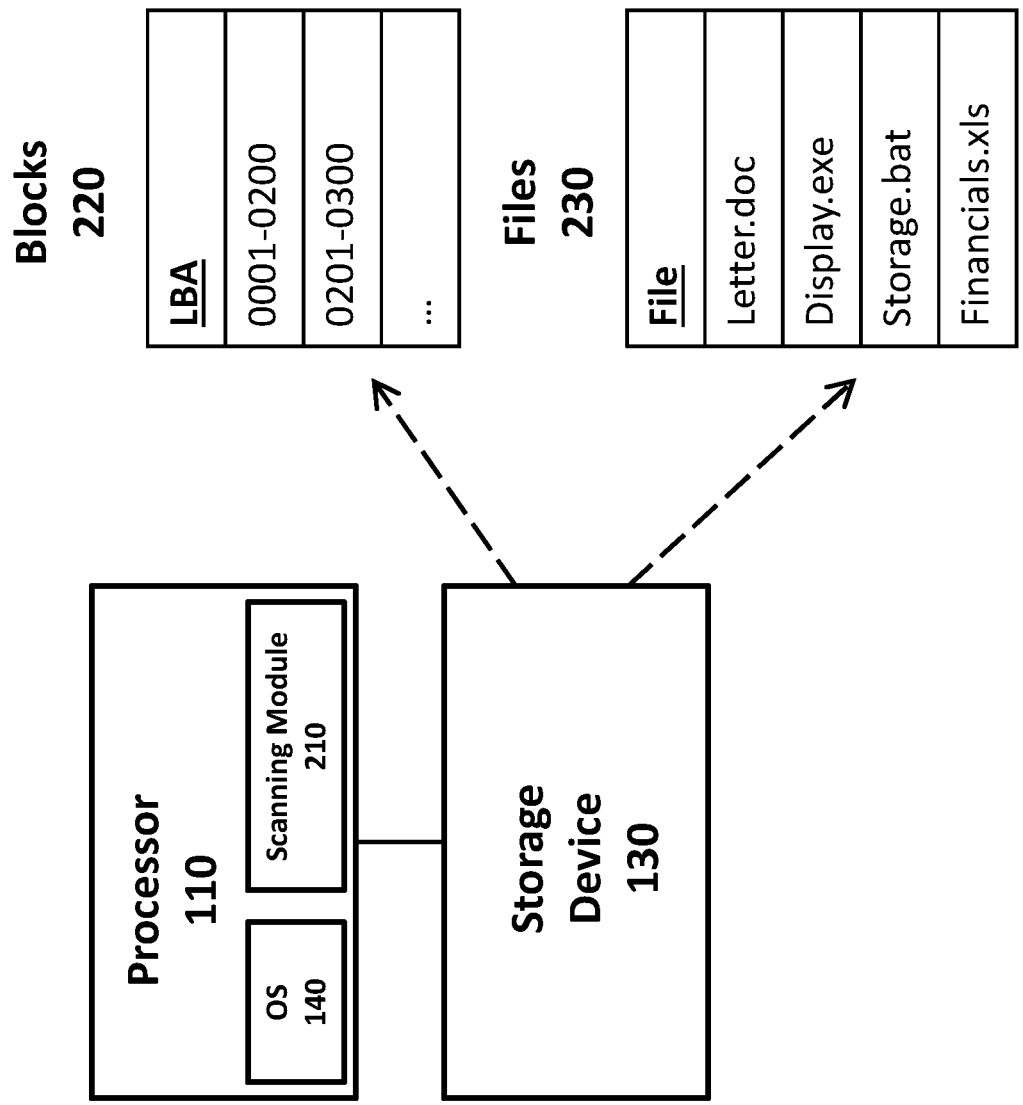
FIG. 2 depicts prior art virus scan software.
Figure 3:
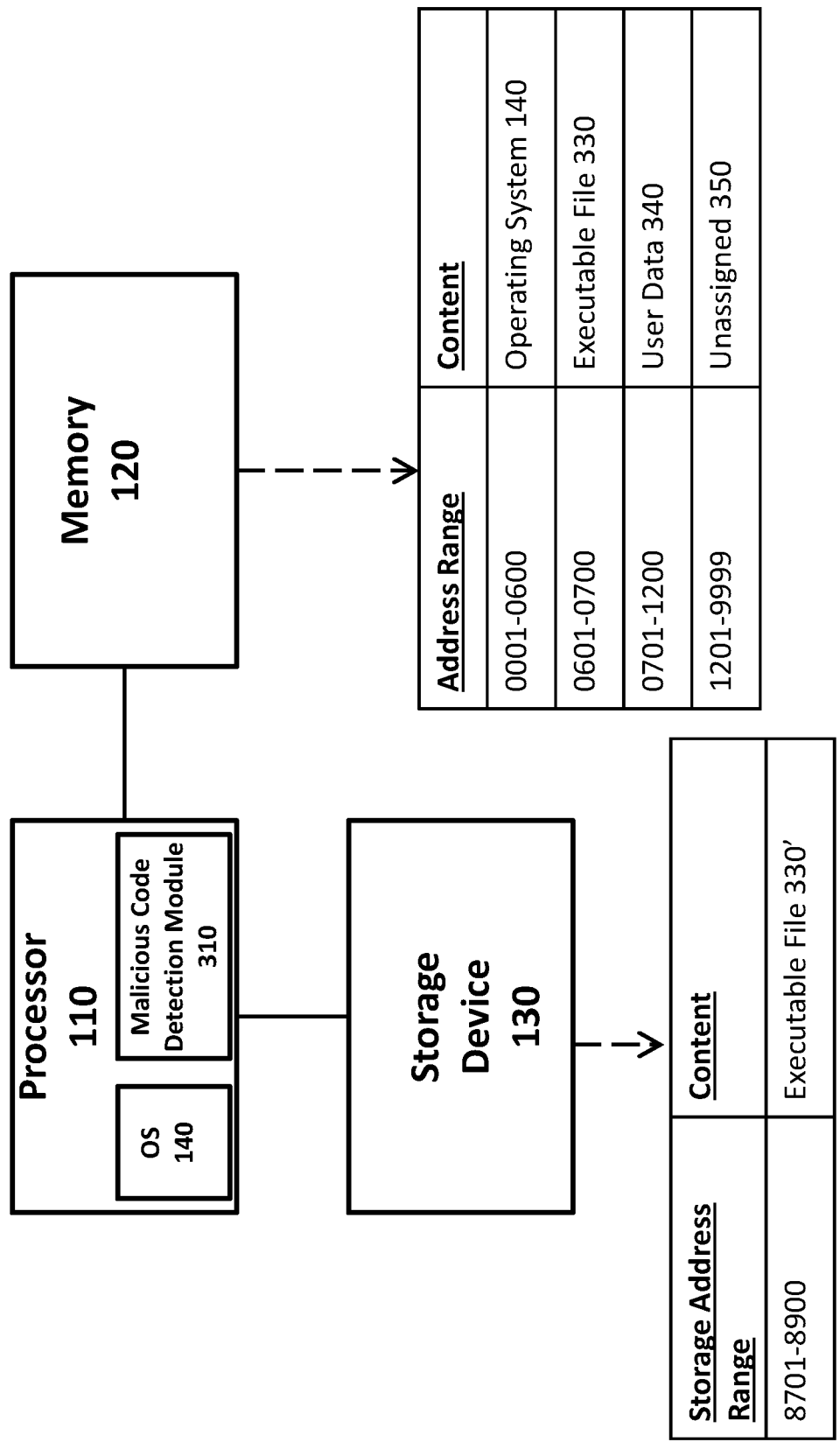
FIG. 3 depicts an embodiment of a malicious code detection module.

FIG. 3 depicts an embodiment of computing device 300. Computing device 300 comprises processor 110, memory 120, storage device 130, and operating system 140 as in the prior art. Computing device 300 also comprises malicious code detection module 310, which is a set of code executed by processor 110 for performing the functions described herein.

Malicious code detection module 310 analyzes the contents of memory 120. In this example, memory 120 contains operating system 140, executable file 330, user data 340, and an unassigned area 350, at the exemplary address ranges shown in FIG. 3. Executable file 330 can be identified as an executable file through numerous techniques. One technique is to read attribute information stored by operating system 140 for each file. For example, the MICROSOFT WINDOWS operating system explicitly labels a memory region storing an executable file as MEM_IMAGE, which is a special memory type that is used only for regions of memory associated with executable files and this information is stored in the attribute information. Another technique is to examine the file header of the file. For example, in Microsoft Windows variations of operating system 140, most files will contain an identifiable MZ and PE header at the beginning of the file, which will indicate if the file is executable.

When malicious code detection module 310 finds executable file 330 in memory 120, it searches for the same file stored in storage device 130 (i.e., the file stored on disk), here denoted as executable file 330'. Typically, the operating system kernel of operating system 140 keeps track of MEM_IMAGE memory regions and their corresponding file on disk. For each MEM_IMAGE region identified, malicious code detection module 310 will query operating system 140 to retrieve the corresponding path to the on-disk executable file on storage device 130. Another technique is to simply search for a file name in storage device 130, as executable files 330 and 330' often have the same file name (e.g., "install.exe"), and the file name can be used to locate executable file 330'.

Malware and other malicious code often utilize techniques that tamper critical code or data sections of legitimate, trusted executable files in memory but not in non-volatile storage. The attackers hope that these tactics conceal their activity from security software or the watchful eye of systems administrators. Popular techniques that involve such tampering include DLL-side loading and process hollowing. Less common but highly advanced techniques include module overwriting. An important fact of these techniques is they do not make modifications to the corresponding executable files on disk. Thus, in the example of FIG. 3, executable file 330' might be a legitimate file stored on disk, but executable file 330 in memory 120 might be malware.

Figure 4:
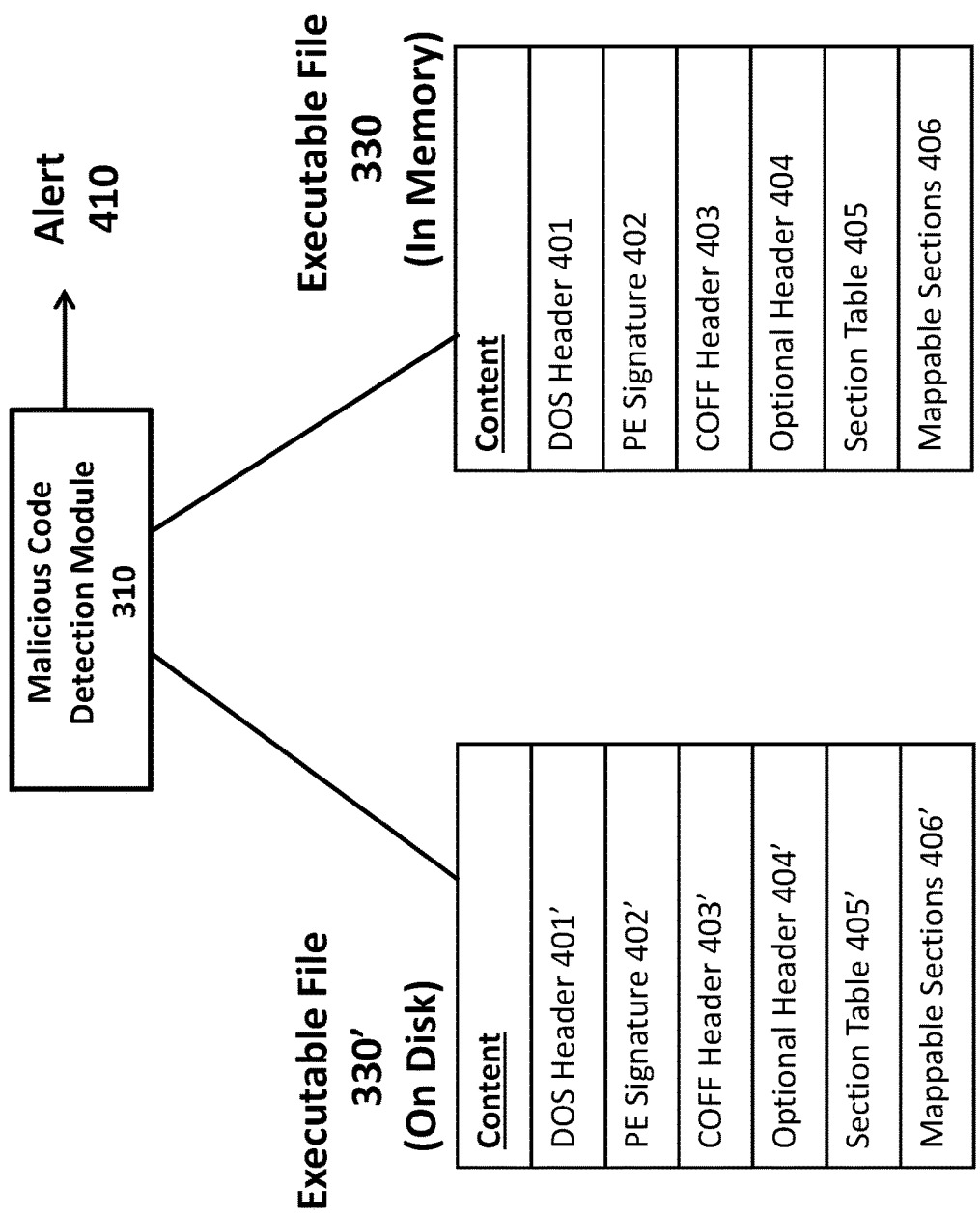
FIG. 4 depicts a validation process by a malicious code detection module that compares components of an executable file in memory against components in the same file stored in non-volatile storage.

With reference to FIG. 4, malicious code detection module 310 then performs a validation process to determine if executable file 330 is the same file as executable file 330'. If the validation fails, alert 410 is generated. This is a challenging process, because during normal execution of legitimate files, an operating system 140 often will modify a file when it loads it into memory 120 from storage device 130. For example, when an executable file is loaded into memory 120 for execution, the operating system loader makes a number of changes to allow for normal execution. This includes resolving imports and modifying the import address table (IAT). It also includes relocating the module if its load base address does not match the load base address stored in its PE header. During the relocation step, the system loader parses the relocation table and modifies the corresponding code sections with necessary changes. Other normal modifications include application compatibility (AppCompat) shims and in-line hooks used by security or other software. The challenge is to account for such legitimate alterations and only flag abnormal differences.

Certain components of files typically are not altered by the loading and execution process, and in a preferred embodiment, malicious code detection module 310 compares one or more of those components in executable file 330 and executable file 330' during a validation process.

In FIG. 4, executable file 330 and executable file 330' are MICROSOFT portable execution (PE) files. These are exemplary only, and it is understood other types of executable files can be validated using the embodiments. A PE file typically comprises a DOS header, PE signature, COFF header, optional header, section table, and mappable sections. Thus, executable file 330 comprises DOS header 401, PE signature 402, COFF header 403, optional header 404, section table 405, and mappable sections 406. Similarly, executable file 330' comprises DOS header 401', PE signature 402', COFF header 403', optional header 404', section table 405', and mappable sections 406'.

The preferred embodiment of malicious code detection module 310 compares one or more of the following components: (1) DOS header 401 and DOS header 401'; (2) PE signature 402 and PE signature 402'; and (3) the first X bytes of code (e.g., 32 bytes) at the entry point for the file, which typically is found at the beginning of mappable sections 406 and 406'. Other components can be compared instead of or in addition to these components. In the alternative, the entire code section found in mappable sections 406 and 406' can be compared. Comparing the entirety of the code increases security at the expense of time. Comparing only X bytes of code at the entry point requires less time at the expense of security.

Figure 5:
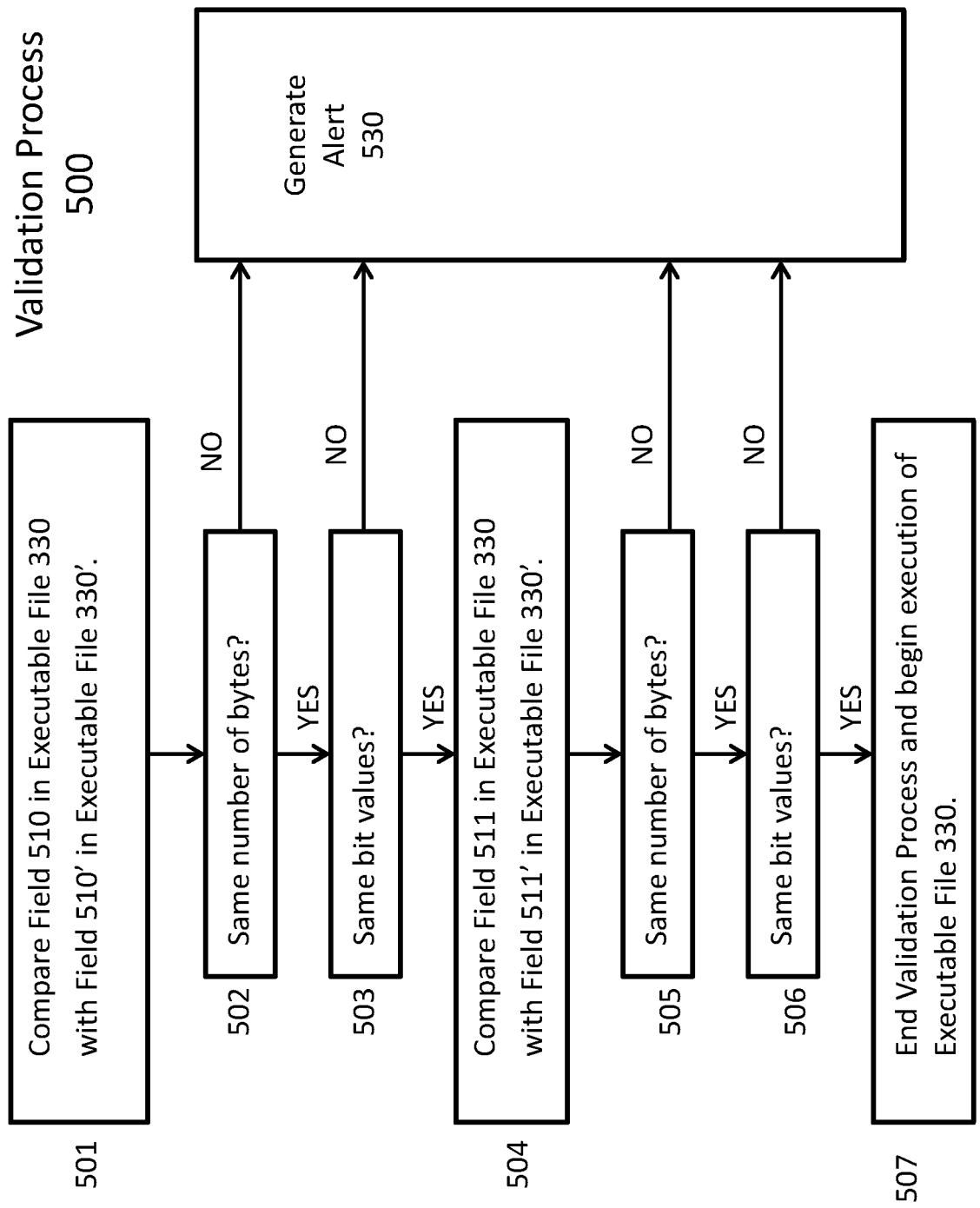
FIG. 5 depicts further details regarding the validation process of FIG. 4.

FIG. 5 depicts additional aspects of validation process 500 executed by malicious code detection module 310. Malicious code detection module 310 first compares field 510 in executable file 330 with field 510' in executable file 330' (step 501). Here, fields 510 and 510' are any pair of corresponding fields in executable files 330 and 330', such as the pairs of fields described in the previous paragraph. Malicious code detection module 310 first determines if fields 510 and 510' contain the same number of bytes (step 502). If they do not, alert 530 is generated. If they do, then the next step is performed. In the next step, malicious code detection module 310 performs a bit-by-bit comparison of fields 510 and 510' to determine if they are identical (step 503). If they are not, alert 530 is generated. If they are, then the next step is performed.

Malicious code detection module 310 then compares field 511 in executable file 330 with field 511' in executable file 330' (step 504). Here, fields 511 and 511' are any pair of corresponding fields in executable files 330 and 330', different than fields 510 and 510', such as the pairs of fields described in the previous paragraph. Malicious code detection module 310 determines if fields 511 and 511' contain the same number of bytes (step 505). If they do not, alert 530 is generated. If they do, then the next step is performed. In the next step, malicious code detection module 310 performs a bit-by-bit comparison of fields 511 and 511' to determine if they are identical (step 506). If they are not, alert 530 is generated. If they are, then the validation process terminates, and processor 110 begins execution of executable file 330.

In validation process 500, two pairs of components of executable files 330 and 330' were compared, but one of ordinary skill in the art will understand that this number can vary. For instance, to improve the speed of the system, only one pair might be compared. Or to increase the security of the system, more than two pairs might be compared. It also is to be understood that comparing the size and content of a field need not both be performed, and one instead could compare only one of those two parameters.

If alert 530 is generated during validation process 500, there is some difference in the compared fields of executable file 330 in memory 120 and executable file 330' in storage device 130. There might be an innocuous reason for this difference, or executable file 330 might be malware. It is common for malware attackers to embed malware in files that mimic legitimate files. It also is common for malware attackers to modify legitimate files into malware. Thus, alert 530 signifies that executable file 330 might be malicious.

Alert 530 can take any variety of forms. Alert 530 can be a message displayed on a display operated by a user or administrator. Alert 530 also might be an email, SMS message, MMS message, or other message sent to a device operated by a user or administrator. Alert 530 also might be an audible sound generated by computing device 300. In the alternative, instead of generating alert 530, malicious code detection module 310 could cause the offending process to terminate or cause the execution of the offending process to be suspended.

An additional challenge exists if the executable file is stored in non-volatile storage using a "software packing" process. Software packing is a common technique used by legitimate software and malware alike. Software packing is used to compress or encrypt a program on disk. At run time, the program decompresses or decrypts itself to reveal its true functionality. Unfortunately, this self-modifying functionality translates to a significant difference between executable file 330 in memory 120 and executable file 330' on disk, as file 330' will be a packed version of file 330. One option is to unpack executable file 330' and then perform the same validation process 500 described above. This will be time consuming, however, and it may be desirable to only implement that procedure for certain packed files.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The invention claimed is:

1. A method of validating an executable file to identify potential malware in a computing device comprising a processor, memory, non-volatile storage, an operating system, and a malicious code detection module, the method comprising:
    identifying, by the malicious code detection module, a first executable file in the memory, the first executable file including:
    a first plurality of components that are altered by the operating system when loaded into the memory, and
    a second plurality of components that are not altered by the operating system when loaded into the memory;
    identifying, by the malicious code detection module, a second executable file in the non-volatile storage, wherein the first executable file and the second executable file are associated with one another by the operating system;
    determining that the second executable file has been compressed and/or encrypted using software packing;
    determining whether the second executable file is capable of being unpacked;
    unpacking the second executable file when the second executable file is capable of being unpacked;
    comparing, by the malicious code detection module, a size of a first component of the second plurality of components of the first executable file and a size of a first component of a second plurality of components of the second executable file,
    wherein comparing includes accounting for changes to the second executable file caused by the unpacking of the second executable file, and further wherein when the second executable file has not been compressed and/or encrypted using software packing, the changes need not be accounted for; and
    generating an alert when the size of the first component of the second plurality of components of the first executable file and the size of the first component of the second plurality of components of the second executable file are different in terms of a number of bytes and bit-by-bit comparison,
    wherein the first component of the second plurality of components of the first executable file is less than the entirety of the first executable file and the first component of the second plurality of components of the second executable file is less than the entirety of the second executable file.

2. The method of claim 1, further comprising:
    comparing, by the malicious code detection module, the content of the first component of the second plurality of components of the first executable file and the content of the first component of the second plurality of components of the second executable file; and
    generating an alert when the content of the first component of the second plurality of components of the first executable file and the content of the first component of the second plurality of components of the second executable file are different.

3. The method of claim 2, further comprising:
    comparing, by the malicious code detection module, a size of a second component of the second plurality of components of the first executable file and a size of a second component of the second plurality of components of the second executable file; and
    generating an alert when the size of the second component of the second plurality of components of the first executable file and the size of the second component of the second plurality of components of the second executable file are different, wherein the second component of the first executable file is less than the entirety of the first executable file and the second component of the second executable file is less than the entirety of the second executable file.

4. The method of claim 3, further comprising:
    comparing, by the malicious code detection module, the content of the second component of the second plurality of components of the first executable file and the content of the second component of the second plurality of components of the second executable file; and
    generating an alert when the content of the second component of the second plurality of components of the first executable file and the content of the second component of the second plurality of components of the second executable file are different.

5. The method of claim 1, wherein the first executable file is a portable executable file and the second executable file is a portable executable file.

6. The method of claim 2, wherein the first executable file is a portable executable file and the second executable file is a portable executable file.

7. The method of claim 3, wherein the first executable file is a portable executable file and the second executable file is a portable executable file.

8. The method of claim 4, wherein the first executable file is a portable executable file and the second executable file is a portable executable file.

9. The method of claim 5, wherein the first component of the second plurality of components of the first executable file is a DOS header and the first component of the second plurality of components of the second executable file is a DOS header.

10. The method of claim 3, wherein the second component of the second plurality of components of the first executable file is a set of code and the second component of the second plurality of components of the second executable file is a set of code.

11. A computing device comprising:
    a processor;
    memory;
    a non-volatile storage device;
    an operating system; and
    a malicious code detection module stored in the memory and executed by the processor, the malicious code detection module comprising instructions for:
    identifying a first executable file in the memory, the first executable file including:
    a first plurality of components that are altered by the operating system when loaded into the memory, and a second plurality of components that are not altered by the operating system when loaded into the memory;

identifying a second executable file in the non-volatile storage device, wherein the first executable file is associated with the second executable file by the operating system;

determining that the second executable file has been compressed and/or encrypted using software packing;

determining whether the second executable file is capable of being unpacked;

unpacking the second executable file when the second executable file is capable of being unpacked;

comparing a size of a first component of the second plurality of components of the first executable file and a size of a first component of a second plurality of components of the second executable file, wherein comparing includes accounting for changes to the second executable file caused by the unpacking of the second executable file, and further wherein when the second executable file has not been compressed and/or encrypted using software packing, the changes need not be accounted for;

identifying permissible modifications to the first executable file based on execution of the first executable file; and generating an alert if the size of the first component of the second plurality of components of the first executable file and the size of the first component of the second plurality of components of the second executable file are different in terms of a number of bytes and bit-by-bit comparison, wherein the alert is not triggered when the difference relates to the permissible modifications, and wherein the first component of the second plurality of components of the first executable file is less than the entirety of the first executable file and the first component of the second plurality of components of the second executable file is less than the entirety of the second executable file.

12. The device of claim 11, wherein the malicious code detection module further comprises instructions for:

comparing the content of the first component of the second plurality of components of the first executable file and the content of the first component of the second plurality of components of the second executable file; and generating an alert when the content of the first component of the second plurality of components of the first executable file and the content of the first component of the second plurality of components of the second executable file are different.

13. The device of claim 12, wherein the malicious code detection module further comprises instructions for:

comparing a size of a second component of the second plurality of components of the first executable file and a size of a second component of the second plurality of components of the second executable file; and generating an alert if the size of the second component of the second plurality of components of the first executable file and the size of the second component of the second plurality of components of the second executable file are different, wherein the second component of the first executable file is less than the entirety of the first executable file and the second component of the second executable file is less than the entirety of the second executable file.

14. The device of claim 12, wherein the malicious code detection module further comprises instructions for:

comparing, by the malicious code detection module, the content of the second component of the second plurality of components of the first executable file and the content of the second component of the second plurality of components of the second executable file; and generating an alert when the content of the second component of the second plurality of components of the first executable file and the content of the second component of the second plurality of components of the second executable file are different.

15. The device of claim 11, wherein the first executable file is a portable executable file and the second executable file is a portable executable file.

16. The device of claim 12, wherein the first executable file is a portable executable file and the second executable file is a portable executable file.

17. The device of claim 13, wherein the first executable file is a portable executable file and the second executable file is a portable executable file.

18. The device of claim 13, further comprising resolving changes to an import address table for the first executable file.

19. The device of claim 15, wherein the first component of the second plurality of components of the first executable file is a DOS header and the first component of the second plurality of components of the second executable file is a DOS header.

20. The device of claim 14, wherein the second component of the second plurality of components of the first executable file is a set of code and the second component of the second plurality of components of the second executable file is a set of code.

21. The method of claim 1, the method further comprising: decrypting at least one second plurality of components when loading into the memory, wherein at least one of the second plurality of components is encrypted.

22. The method of claim 1, the method further comprising: decompressing at least one second plurality of components when loading into the memory, wherein at least one of the second plurality of components is compressed.

* * * * *